United States Patent [19]
Danley et al.

[11] Patent Number: 5,313,127
[45] Date of Patent: May 17, 1994

[54] MOVING MAGNET MOTOR

[75] Inventors: Thomas J. Danley, Highland Park; Charles A. Rey, Riverwoods, both of Ill.

[73] Assignee: Intersonics, Inc., Northbrook, Ill.

[21] Appl. No.: 14,217

[22] Filed: Feb. 5, 1993

[51] Int. Cl.⁵ .............................................. H02K 33/00
[52] U.S. Cl. .................................... 310/36; 310/254; 310/156
[58] Field of Search ............... 310/36, 37, 156, 254, 310/256, 180; 340/390; 381/150, 192, 199, 200, 201

[56]  References Cited
U.S. PATENT DOCUMENTS

| | | | |
|---|---|---|---|
| 4,510,403 | 4/1985 | Vanderlaan et al. | 310/36 |
| 4,564,727 | 1/1986 | Danley | 179/116 |
| 4,595,849 | 6/1986 | Cuénoud | 310/36 |
| 4,641,812 | 2/1987 | Vanderlaan et al. | 251/65 |
| 4,763,358 | 8/1988 | Danley | 381/156 |
| 4,795,929 | 1/1989 | Elgass et al. | 310/36 |
| 4,959,568 | 9/1990 | Stokes | 310/51 |
| 5,191,618 | 3/1993 | Hisey | 381/158 |
| 5,210,452 | 5/1993 | Pratap et al. | 310/12 |

Primary Examiner—Steven L. Stephan
Assistant Examiner—D. R. Haszko
Attorney, Agent, or Firm—Juettner Pyle & Lloyd

[57] ABSTRACT

A motor includes a permanent magnet rotor having opposed magnetic poles supported for rotation about an axis. A stator surrounds the rotor and consists of conductors extending parallel and uniformly around the rotor axis, in order to provide a uniform current sheet and a constant force per unit current acting on the rotor.

7 Claims, 3 Drawing Sheets

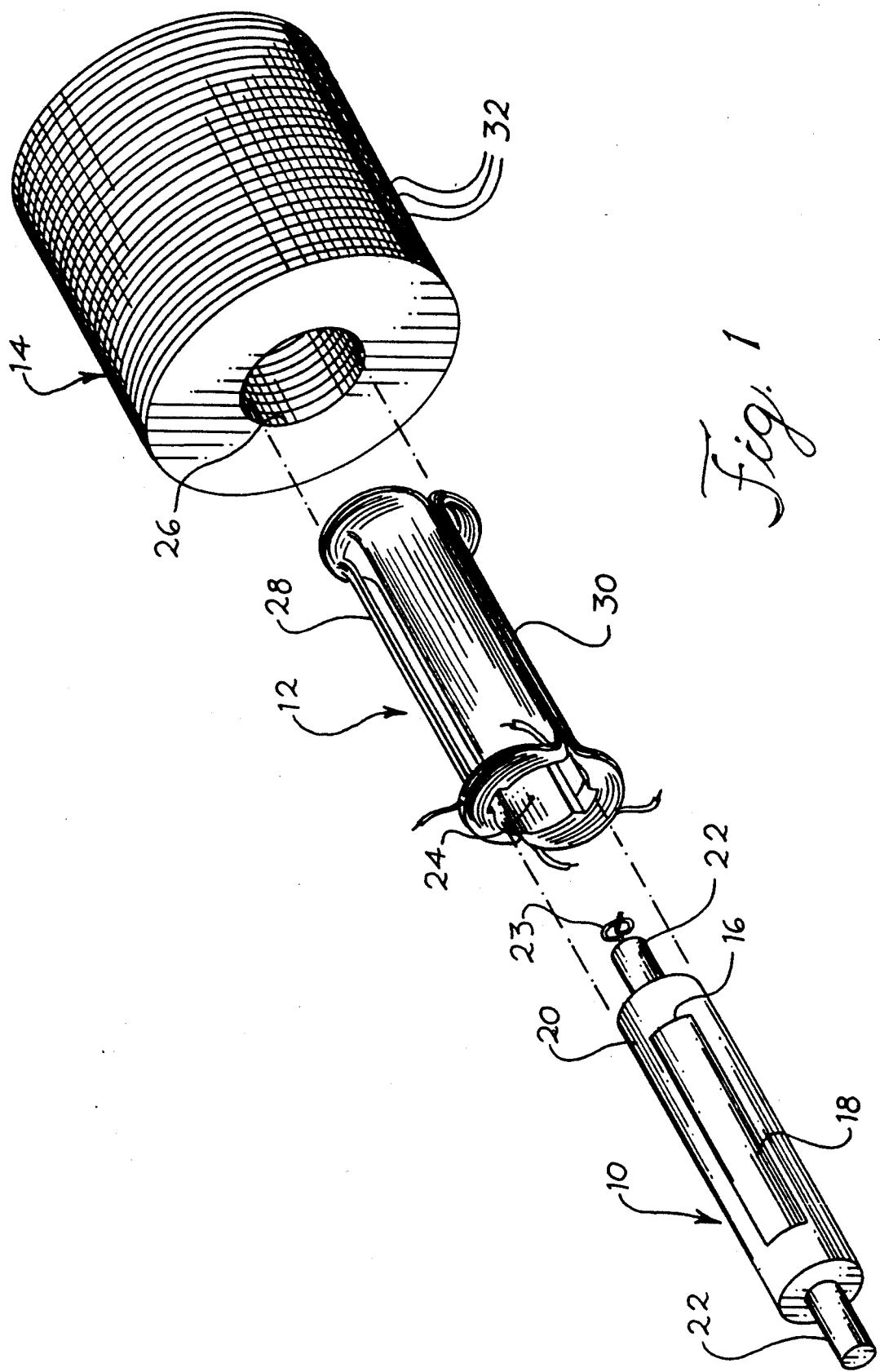

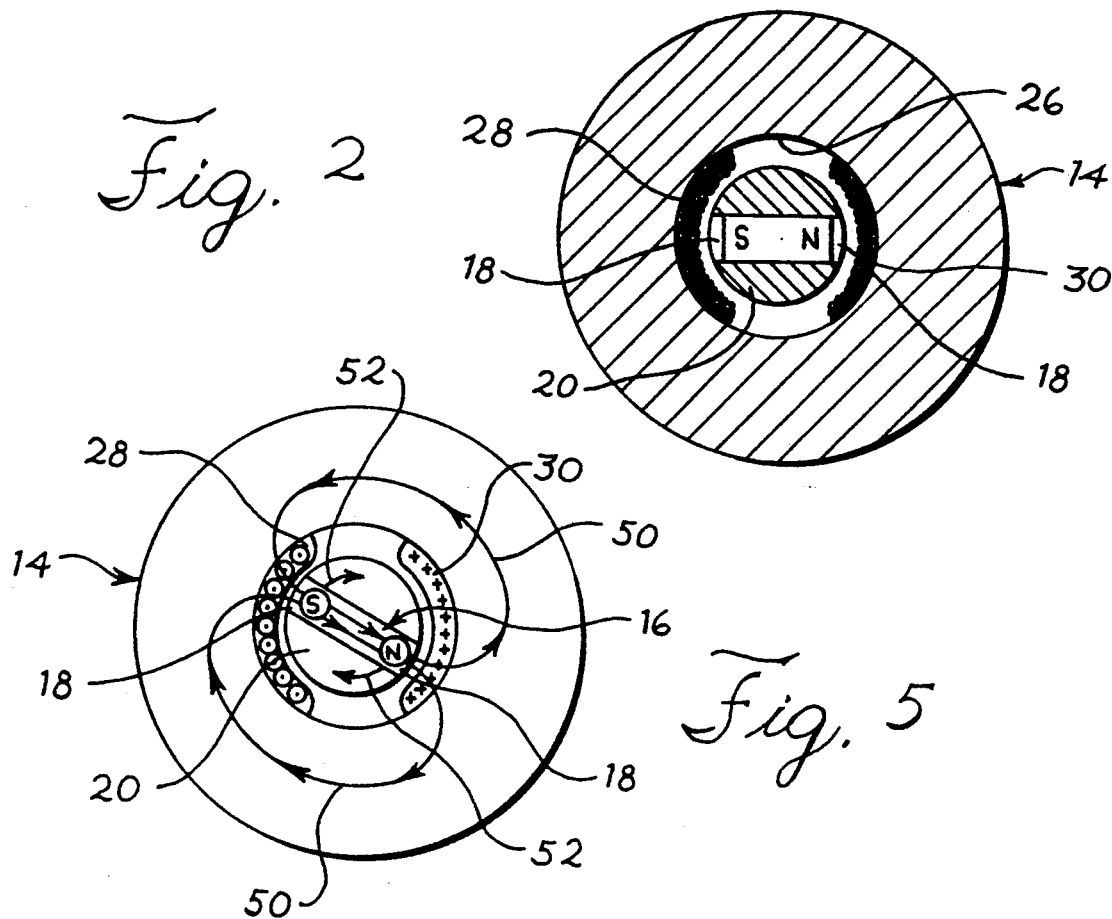
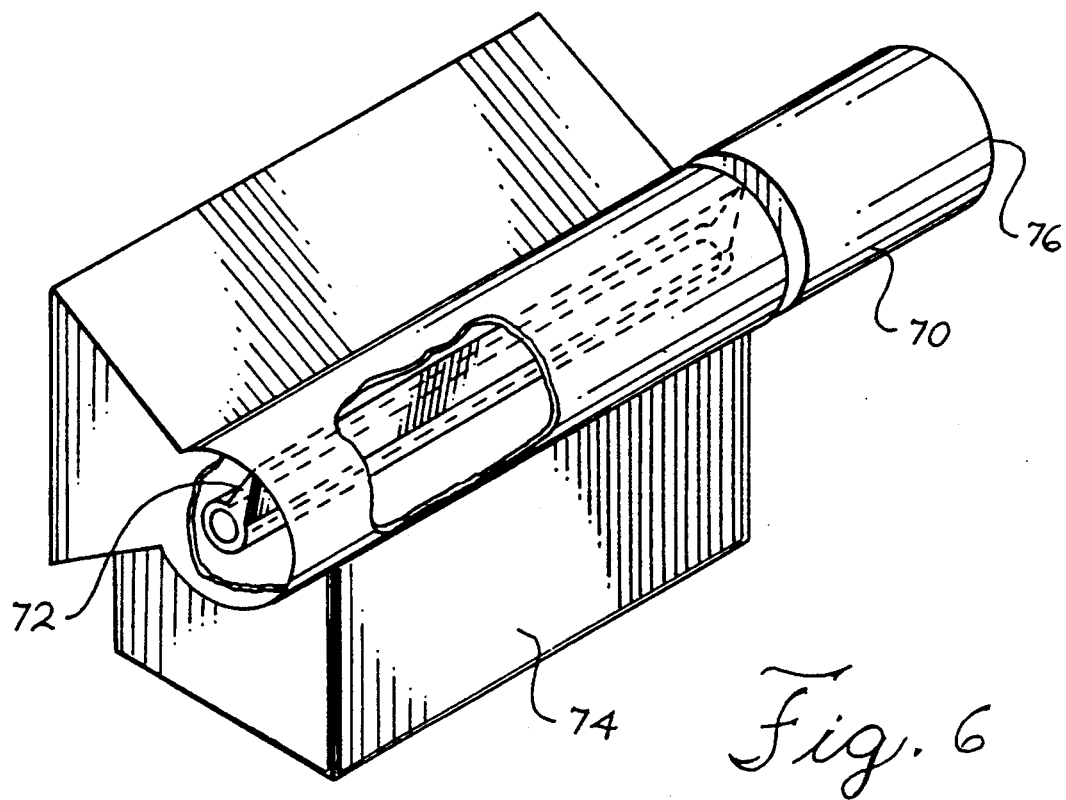

MOVING MAGNET MOTOR

BACKGROUND OF THE INVENTION

This invention relates to a transducer motor having a rotor comprising a permanent dipole magnet and a stator comprising coils wound in a particular fashion to interact with the magnet.

Several proposals have been made to use rotary motors to drive the radiator of a transducer or loudspeaker. This is in contrast to conventional loudspeakers having linear drives, in which a cylindrical voice coil is suspended around its axis between the poles of a magnet and is axially movable along the axis to a limited extent.

In U.S. Pat. No. 4,763,358, the rotary shaft of a motor is connected directly to a vane and enclosed within a baffled enclosure. The motor employed is of the commutated type, in which the current in the coil of the rotor is switched to the active portion of the coil as it rotates. As a result, the force per unit current on the shaft remains constant, irrespective of the rotary position or degree of rotation of the shaft.

Another loudspeaker driven by a motor is described in U.S. Pat. No. 4,564,727. In this patent, the rotary motion of the shaft of a commutated motor is converted to linear motion and is used to drive the radiator of the speaker.

The use of rotary motors to drive loudspeakers offers numerous improvement over conventional drives. Rotary motors are generally more efficient, may have an unlimited degree of movement, and, with commutation, can provide a constant force per unit of current. Linear drives of conventional voice coil speakers are limited by the mass of the moving coil, limited excursion, maximum available magnet strength, and the like. On the other hand, conventional commutated rotary motors are relatively complicated in design and expensive to produce, and also may have limited velocity and acceleration values.

SUMMARY OF THE INVENTION

In accordance with the present invention, a rotary permanent magnet motor is provided, having a permanent magnet as the rotor, rotating around an axis. A stator, comprising a coil, carrying an audio or other control signal, is provided in a spaced location from the rotor. The conductors or wires of the coil are arranged to run substantially parallel to the axis of the rotor, and the coils are arranged in two spaced portions surrounded by a continuous iron magnetic return yoke. The magnet poles are in opposition to active portions of the coil portions.

In operation, current in one of the coil halves flows in a direction opposite to the direction of flow in the other coil half. The current in the coils exerts a force on the magnetic rotor which is perpendicular to the current path, causing the rotor to rotate. Since the current is uniform in the coil halves, the torque imposed on the rotor is constant for a given magnet and coil current over a finite rotational angle.

Because of the manner of construction, the flux from each pole of the rotor magnet stays in the field of one of the coil halves, and the rotor, therefore, is capable of rotation of less than one half revolution. The torque on the rotor is controlled by the amount of current in the coils, the number of turns, and the magnet strength. Reversing the direction of the current in the coils causes reversal in the rotary direction of the rotor.

As distinguished from prior art devices, the motor of the present invention has no discreet poles in the stator; rather, the stator provides uniform current sheets and provides a constant force per unit current on the rotor as it moves between excursion limits. Unlike prior art motors, the motor of the present invention is capable of rotation over a wide range of velocities and at very high accelerations. The motor is useful in driving a wide variety of devices, such as loud speakers, scanning mirrors, and robotic movements.

THE DRAWINGS

FIG. 1 is a perspective assembly view showing the essential components of the motor of the present invention.

FIG. 2 is a sectional view through the assembly of FIG. 1.

FIG. 5 is a simplified sectional view similar to FIG. 2 but showing the magnetic flux lines and forces on the rotor.

FIG. 6 is a perspective view of a rotary sound transducer which may be employed with the motor of the present invention.

DESCRIPTION OF THE PREFERRED EMBODIMENTS

Figure 3:
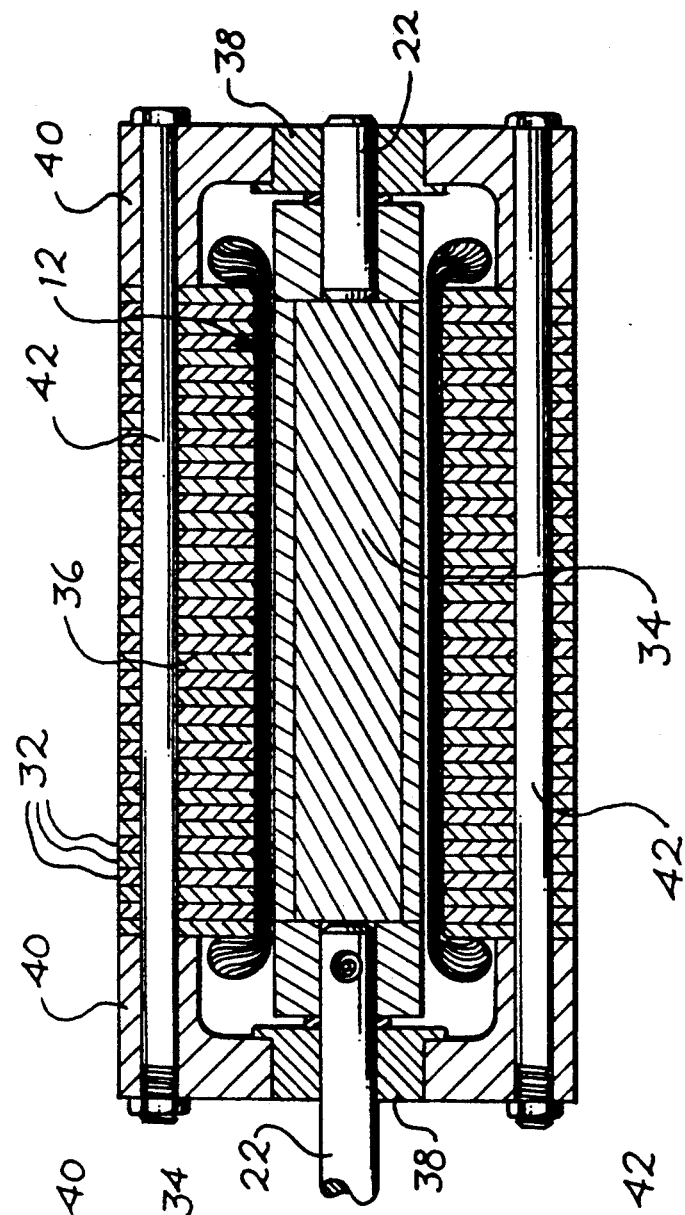
FIG. 3 is a vertical longitudinal section through the motor of the present invention.

FIG. 1 illustrates the major components of the present invention. A rotor 10 is mounted for rotation in a stator comprising a coil 12 and a magnetic return structure 14. The rotor 10 is of the permanent magnet type and comprises a permanent magnet 16 having a pair of opposite exposed poles 18. As shown, the magnet may be bar shaped and supported in a cylindrical aluminum rotor body 20 having shaft ends 22, extending outwardly therefrom. The magnet may be of one piece construction or may be made up from a number of segments. Suitable means, such as a helical return spring 23, may be employed to urge or return the rotor to a neutral position.

The coil 12 has a cylindrical opening 24 to receive the rotor 10 and is secured, such as by a suitable adhesive, into a cylindrical opening 26 in the continuous magnetic return structure 14. As shown in FIGS. 1 and 2, the coil 12 may be formed of two spaced halves 28 and 30 with the wires or conductors therein running continuously in a direction parallel to the axis of the rotor. The coil is formed such that when current is applied to the leads, the current will flow in one direction in one half and in the opposite direction in the other half. As shown in FIG. 2, the coil may be made by forming a pair of continuous loops around a cylindrical mandrel, such that each loop forms one-half of each of the spaced halves 28 and 30. Thus, the coil 12 is a continuous elongated loop of insulated conductor or wire, which is preferably arranged in layers, and provides a pair of opposed, spaced semi-cylindrical current fields or sheets for interaction with the poles of the permanent magnet rotor. The ends of the coil may be bent outwardly as shown to shorten the overall length, or to prevent contact with the rotor or shafts.

The magnetic return structure 14 may comprise a plurality of stacked insulated iron washers or plates 32 which are sufficient in number to provide a structure coextensive with the length of the rotor and coil. The insulated plates eliminate the generation of eddy currents, with the insulation being transverse to the direction of the eddy currents. In the alternative, the structure 14 may be composed of a solid conductive metal, such as iron pipe.

Figure 4:
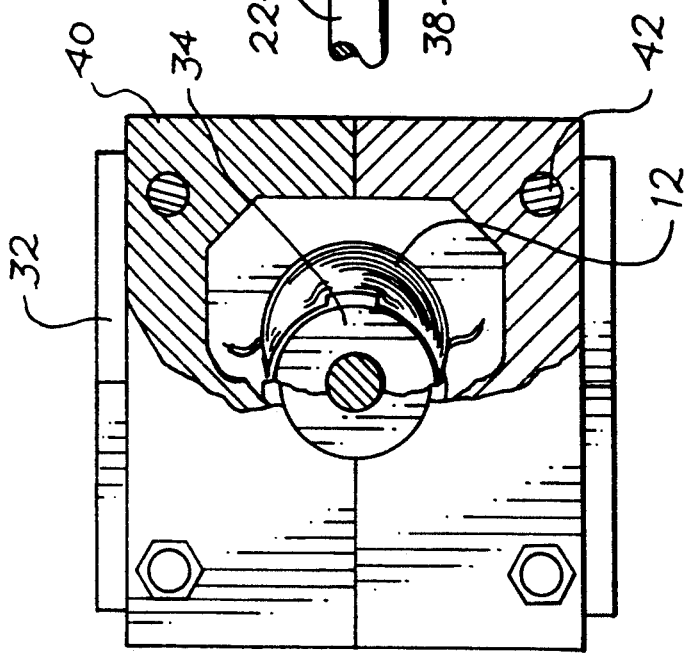
FIG. 4 is an end view of the motor show in FIG. 3, with portions removed for clarity.

FIGS. 3-5 show some additional details of construction of a preferred embodiment of the motor. The magnet as shown at 34 may be a rectangular bar, and iron strips 36 having outer cylindrical surfaces may be fixed to the opposite poles in opposition to the respective coil halves. The end shafts 22 may be supported by standard bearings 38 mounted in end plates 40. The end plates 40 are secured to the structure by means of bolts 42 extending through aligned openings in the end plates and through the magnetic return structure 14. In the embodiment shown, the washers 32 are square rather than circular.

As illustrated in FIG. 5, the coil halves 28 and 30 provide what may be termed current sheets. There is a Lorentz force on the current sheets produced by the field of the permanent magnet 16, since the magnetic field traverses the coil or current sheets into the magnetic return yoke and back around to the opposite pole of the magnet, as shown by the arrowed lines at 50. The force which exists on the coil halves 28 and 30 has a reaction force opposite in direction acting on the permanent magnet, as shown by the arrows at 52. Since the current in each current sheet is substantially uniform, the torque on the rotor and output shaft remains constant with changing position for a given magnet and coil current. By reversing the direction of current in the coil halves, the torque is reversed, and the rotor moves in the opposite rotary direction. Consequently, the rotor exerts force and rotates back and forth in response to the amount of current and the current direction.

A distinct advantage of the motor of the present invention is power capacity. Since the coil is fixed and is in contact with the metallic magnetic return structure, heat due to electrical resistance in the coil is dissipated. It may be seen that, due to arrangement of the coil relative to the magnet, the rotor is only capable of rotation of less than 180° and typically will be employed at rotations of plus or minus 60° from neutral or 120° total.

Another advantage is that the design lends itself to produce a strong magnetic field with a minimal angular moment of inertia of the motor. The magnet is preferably composed of a modern rare earth, high energy-density material such as neodymium. This permits large torque-to-inertia ratios, which are advantageous in driving a variety of mechanical devices. Such devices include, for example, high performance loudspeakers, optical scanners such as laser beam scanners, and many automated or robotic applications where rapid accelerations or movements, or controlled linear torques may be required.

The motor of the present invention can operate over a wide range of velocities and at high accelerations. An early prototype was found to operate over a range of velocities from zero to in excess of one thousand radians per second and could accelerate in excess of one million radians per second, per second.

FIG. 7 is a view taken from U.S. Pat. No. 4,763,358, which patent is incorporated herein by reference. As described in that patent, a commutated motor 70 having a coil for a rotor is used to drive a vane 72 back and forth in an enclosure 74 to produce sound, with the leads 76 of the motor being connected to an audio source. A rotary radiator is inherently more efficient than a linear drive, and even greater efficiencies may be realized if the conventional commutated motor is replaced by the motor of the present invention. In addition, the motion of the motor of the present invention can be converted to linear motion as described in U.S. Pat. No. 4,763,358 to drive a sound radiator such as a speaker cone.

We claim:

1. An electric motor having limited rotation, said motor comprising a rotor comprising a permanent magnet with opposite poles, said rotor being rotatable about an axis, a coil around said rotor and coextensive therewith, said coil comprising a pair of spaced coil portions in opposition to the poles of said magnet and having a plurality of conductors extending substantially radially uniformly and in parallel with the axis of the rotor, means for supplying said coil portions with current, said coil being wired such that current moves in one direction in one of said portions while moving in the opposite direction in the other of said portions, said coil portions providing substantially uniform axial current sheets relative to said rotor and providing a constant torque per unit of current, and a continuous magnetic return structure around said coil.

2. The electric motor of claim 1 additionally comprising sound radiating means, means for connecting said rotor to said sound radiating means, and wherein said means for supplying said coil portions with current comprises an audio signal.

3. The electric motor of claim 1 wherein an output shaft is connected to said rotor, and a vane means is connected to said shaft for producing sound.

4. The electric motor of claim 1 wherein said magnetic return structure comprises a plurality of stacked plates having an aperture therein for receipt of said coil.

5. An electromechanical transducer having a rotor rotatable about an axis and a stator, said rotor comprising a permanent magnet having a pole, said stator comprising coil means for providing a current sheet in opposition to said pole, said current sheet extending uniformly partially around the axis of said rotor and parallel thereto, and means for providing current to said sheet in a direction parallel to said axis, said coil means exerting a force on said rotor in a direction perpendicular to the direction of said current.

6. The transducer of claim 5 wherein said means for supplying current comprises an audio signal, and means connected to said rotor for radiating sound.

7. The transducer of claim 6 wherein the means for radiating sound comprises a rotary vane.

* * * * *